United States Patent
Shi et al.

(10) Patent No.: US 11,861,584 B2
(45) Date of Patent: Jan. 2, 2024

(54) SELF-SERVICE SETTLEMENT METHOD, APPARATUS AND STORAGE MEDIUM

(71) Applicants: BEIJING JINGDONG SHANGKE INFORMATION TECHNOLOGY CO., LTD., Beijing (CN); BEIJING JINGDONG CENTURY TRADING CO., LTD., Beijing (CN)

(72) Inventors: Hailin Shi, Beijing (CN); He Zhao, Beijing (CN); Wu Liu, Beijing (CN); Tao Mei, Beijing (CN); Bowen Zhou, Beijing (CN)

(73) Assignees: BEIJING JINGDONG SHANGKE INFORMATION TECHNOLOGY CO., LTD., Beijing (CN); BEIJING JINGDONG CENTURY TRADING CO., LTD., Beijing (CN)

( * ) Notice: Subject to any disclaimer, the term of this patent is extended or adjusted under 35 U.S.C. 154(b) by 84 days.

(21) Appl. No.: 17/291,187

(22) PCT Filed: Jul. 26, 2019

(86) PCT No.: PCT/CN2019/097950
§ 371 (c)(1),
(2) Date: May 4, 2021

(87) PCT Pub. No.: WO2020/103487
PCT Pub. Date: May 28, 2020

(65) Prior Publication Data
US 2022/0076227 A1    Mar. 10, 2022

(30) Foreign Application Priority Data
Nov. 20, 2018 (CN) .......................... 201811380178.8

(51) Int. Cl.
*G06Q 20/20* (2012.01)
*G06Q 20/18* (2012.01)
(Continued)

(52) U.S. Cl.
CPC .......... *G06Q 20/208* (2013.01); *G06F 18/00* (2023.01); *G06Q 20/18* (2013.01); *G06Q 20/201* (2013.01); *G06Q 30/0631* (2013.01)

(58) Field of Classification Search
CPC .... G06Q 20/208; G06Q 20/18; G06Q 20/201; G06Q 30/0631; G06Q 20/206; G06Q 20/20; G06K 9/62; G07G 1/0063; G07G 3/003; G07G 1/0072; G07G 1/0054
See application file for complete search history.

(56) References Cited

U.S. PATENT DOCUMENTS 9,058,624 B1    6/2015    Krishnamurthy
2008/0027817 A1    1/2008    Iizaka et al.
(Continued)

FOREIGN PATENT DOCUMENTS

CN    103632460 A    3/2014
CN    106663251 A    5/2017
(Continued)

OTHER PUBLICATIONS

Ren, Shaoqing, "Faster R-CNN: Towards Real-Time Object Detection with Region Proposal Networks" Jan. 2016, https://arxiv.org/pdf/1506.01497.pdf (Year: 2016).*
(Continued)

*Primary Examiner* — Allen C Chein
(74) *Attorney, Agent, or Firm* — Oblon, McClelland, Maier & Neustadt, L.L.P.

(57) ABSTRACT

The present disclosure provides a self-service settlement method, apparatus and storage medium, and relates to the technical field of self-service shopping, wherein the method includes: obtaining a monitoring image acquired by an image capture device and corresponding to commodities to
(Continued)

be settled which are placed on a settlement counter; obtaining information of the commodities to be settled through image recognition; obtaining a first weight acquired by a weight detection device, obtaining a second weight based on the information of the commodities to be settled, judging whether the information of the commodities to be settled is matched with commodities to be confirmed according to a weight comparison result; and obtaining purchased commodity settlement information under the condition that the information of the commodities to be settled is matched with the commodities to be confirmed, and performing checkout processing.

18 Claims, 6 Drawing Sheets

(51) Int. Cl.
*G06Q 30/0601* (2023.01)
*G06F 18/00* (2023.01)

(56) References Cited

U.S. PATENT DOCUMENTS

| | | | |
|---|---|---|---|
| 2013/0006787 A1 | 1/2013 | Iizaka et al. | |
| 2014/0176719 A1* | 6/2014 | Migdal | G06T 3/0006 |
| | | | 348/150 |
| 2017/0323345 A1* | 11/2017 | Flowers | G06Q 30/0269 |
| 2019/0108396 A1* | 4/2019 | Dal Mutto | G06V 20/52 |
| 2019/0236362 A1* | 8/2019 | Srivastava | G06V 10/803 |

FOREIGN PATENT DOCUMENTS

| | | |
|---|---|---|
| CN | 106959149 A | 7/2017 |
| CN | 107563745 A | 1/2018 |
| CN | 107679850 A | 2/2018 |
| CN | 108364422 A | 8/2018 |
| CN | 108537994 A | 9/2018 |
| CN | 108596221 A | 9/2018 |
| CN | 108681953 A | 10/2018 |
| CN | 108734459 A | 11/2018 |
| CN | 108777045 A | 11/2018 |
| CN | 109214806 A | 1/2019 |
| KR | 10-1850315 B1 | 5/2018 |

OTHER PUBLICATIONS

International Search Report dated Sep. 30, 2019 in PCT/CN2019/097950 (submitting English translation only), 2 pages.
Zhao, Z.-Q., et al., "Pedestrian Detection Based on Fast R-CNN and Batch Normalization", International Conference on Intelligent Computing, Intelligent Computing Theories and Application, Jul. 2017, pp. 735-746.

* cited by examiner

SELF-SERVICE SETTLEMENT METHOD, APPARATUS AND STORAGE MEDIUM

CROSS-REFERENCE TO RELATED APPLICATIONS

This application is based on and claims the priority to the Chinese Patent Application No. 201811380178.8, filed on Nov. 20, 2018, the disclosure of which is incorporated hereby as a whole into the present application.

TECHNICAL FIELD

This disclosure relates to the technical field of self-service shopping, and particularly to a self-service settlement method, apparatus and storage medium.

BACKGROUND

In shopping places such as supermarkets, convenience stores, shopping malls, manual settlement is usually performed; after shopping in a supermarket, a customer needs to go to a cash register for settlement; a bar code on each item is scanned by a cashier, then a total amount is calculated through a computer, and the customer pays for it, so that the checkout stage needs to take a long time, and has a poor experience. With the development of the intelligent retail technology, automatic settlement apparatuses also gradually appear in some shopping places, but commodity code scanning or an electronic tag such as RFID (Radio Frequency Identification) is applied in most of the related automatic settlement apparatuses to confirm the commodity identification.

SUMMARY

According to one or more embodiments of the present disclosure, there is provided a self-service settlement method comprising: obtaining a monitoring image captured by an image capture device, wherein the monitoring image corresponds to commodities to be settled which are placed on a settlement counter; recognizing the monitoring image to obtain information of the commodities to be settled, wherein the information of the commodities to be settled comprises a category and quantity of the commodities to be settled; obtaining a first weight corresponding to the commodities to be settled captured by a weight detection device arranged on the settlement counter, and obtaining a second weight corresponding to the commodities to be settled based on the information of the commodities to be settled; judging whether the information of the commodities to be settled is matched with commodities to be confirmed according to a preset matching judgment rule and a comparison result of the first weight and the second weight; and obtaining purchased commodity settlement information based on the information of the commodities to be settled under the condition that the information of the commodities to be settled is matched with the commodities to be confirmed, and performing checkout processing according to the purchased commodity settlement information; wherein the purchased commodity settlement information comprises: the category, quantity and settlement price of the commodities to be settled.

In some embodiments, that recognizing the monitoring image to obtain information of the commodities to be settled comprises: determining a first position corresponding to the commodities to be settled and a second position corresponding to a coordinate scale on the settlement counter in the monitoring image; intercepting an image of the commodities to be settled and a coordinate scale image according to the first position and the second position in the monitoring image; determining size information of the commodities to be settled based on the coordinate scale image and the image of the commodities to be settled; recognizing a commodity type to which the commodities to be settled in the image of the commodities to be settled belong, and obtaining a quantity corresponding to each type of the commodity to be settled; and determining the category of the commodities to be settled based on the size information of the commodities to be settled and the commodity type to which the commodities to be settled belong.

In some embodiments, that determining a first position corresponding to the commodities to be settled and a second position corresponding to a coordinate scale on the settlement counter in the monitoring image comprises: determining the first position and the second position in the monitoring image using an object detection model, wherein the object detection model comprises a convolutional neural network model based on a Faster RCNN algorithm.

In some embodiments, that recognizing a commodity type to which the commodities to be settled in the image of the commodities to be settled belong comprises: establishing a fully connected layer of a convolutional neural network by a Softmax function, and calculating a confidence level of the commodities to be settled belonging to each commodity type by the convolutional neural network; and taking the commodity type with the confidence level greater than a preset threshold as the commodity type of the commodities to be settled.

In some embodiments, pooling layers are provided between convolutional layers of the convolutional neural network, and a batch normalization layer is provided behind the last convolutional layer.

In some embodiments, that obtaining a second weight corresponding to the commodities to be settled based on the information of the commodities to be settled comprises: acquiring a commodity unit weight corresponding to the category of the commodities to be settled; and obtaining the second weight according to the commodity unit weight and the quantity of the commodities to be settled.

In some embodiments, that judging whether the information of the commodities to be settled is matched with the commodities to be confirmed according to a preset matching judgment rule and a comparison result of the first weight and the second weight comprises: obtaining a difference between the first weight and the second weight; judging whether an absolute value of the difference is less than a preset difference threshold; and determining that the information of the commodities to be settled is matched with the commodities to be confirmed under the condition that the absolute value of the difference is less than the preset difference threshold.

In some embodiments, that performing checkout processing according to the purchased commodity settlement information comprises: sending the purchased commodity settlement information to a first display device and a second display device, respectively, to display the purchased commodity settlement information to a customer and a clerk, respectively; and suspending the checkout processing under the condition that a settlement cancellation or settlement error message sent by either of the customer and the clerk with respect to the purchased commodity settlement information is received.

In some embodiments, that performing checkout processing according to the purchased commodity settlement information further comprises: receiving cost payment information sent by a customer terminal and generated according to the purchased commodity settlement information; sending cost payment completion information to the first display device and the second display device under the condition that it is determined that the cost payment information is correct, and setting the commodities to be settled to a paid status, so as to enable the commodities to be settled to pass the detection of a safety detection device; and sending cost payment failure information to the first display device and the second display device under the condition that it is determined that the cost payment information is incorrect.

In some embodiments, the method further comprises: acquiring the purchased commodity settlement information with successful cost payment and corresponding to the customer terminal, and obtaining a commodity category and shopping frequency based on the purchased commodity settlement information; determining a recommended commodity and purchase cycle according to the commodity category and the shopping frequency, and determining pushing time based on the purchase cycle; pushing the recommended commodity to the customer terminal based on the pushing time; and receiving commodity preferential information, judging whether the commodity preferential information is matched with the recommended commodity, and pushing the recommended commodity and the commodity preferential information to the customer terminal under the condition that the commodity preferential information is matched with the recommended commodity.

According to one or more embodiments of the present disclosure, there is provided a self-service settlement apparatus comprising: a processor; and a memory coupled to the processor, storing program instructions which, when executed by the processor, cause the processor to: obtain a monitoring image captured by an image capture device, wherein the monitoring image corresponds to commodities to be settled which are placed on a settlement counter; recognize the monitoring image to obtain information of the commodities to be settled; wherein the information of the commodities to be settled comprises: a category and quantity of the commodities to be settled; obtain a first weight corresponding to the commodities to be settled captured by a weight detection device arranged on the settlement counter, and obtain a second weight corresponding to the commodities to be settled based on the information of the commodities to be settled; judge whether the information of the commodities to be settled is matched with commodities to be confirmed according to a preset matching judgment rule and a comparison result of the first weight and the second weight and obtain purchased commodity settlement information based on the information of the commodities to be settled under the condition that the information of the commodities to be settled is matched with the commodities to be confirmed, and perform checkout processing according to the purchased commodity settlement information, wherein the purchased commodity settlement information comprises the category, quantity and settlement price of the commodities to be settled.

In some embodiments, the recognizing the monitoring image to obtain information of the commodities to be settled comprises: determining a first position corresponding to the commodities to be settled and a second position corresponding to a coordinate scale on the settlement counter in the monitoring image; intercepting an image of the commodities to be settled and a coordinate scale image according to the first position and the second position in the monitoring image; determining size information of the commodities to be settled based on the coordinate scale image and the image of the commodities to be settled; recognizing a commodity type to which the commodities to be settled in the image of the commodities to be settled belong, and obtaining a quantity corresponding to each type of commodity to be settled; and determining the category of the commodities to be settled based on the size information of the commodities to be settled and the commodity type to which the commodities to be settled belong; wherein the determining a first position corresponding to the commodities to be settled and a second position corresponding to a coordinate scale on the settlement counter in the monitoring image comprises: determining the first position and the second position in the monitoring image with the use of an object detection model, wherein the object detection model comprises a convolutional neural network model based on a Faster RCNN algorithm.

In some embodiments, the recognizing a commodity type to which the commodities to be settled in the image of the commodities to be settled belong comprises: establishing a fully connected layer of a convolutional neural network by a Softmax function, and calculating a confidence level of the commodities to be settled belonging to each commodity type by the convolutional neural network; and taking the commodity type with the confidence level greater than a preset threshold as the commodity type of the commodities to be settled; wherein pooling layers are provided between convolutional layers of the convolutional neural network, and a batch normalization layer is provided behind the last convolutional layer.

In some embodiments, the obtaining a second weight corresponding to the commodities to be settled based on the information of the commodities to be settled comprises: acquiring a commodity unit weight corresponding to the category of the commodities to be settled; and obtaining the second weight according to the commodity unit weight and the quantity of the commodities to be settled.

In some embodiments, the judging whether the information of the commodities to be settled is matched with the commodities to be confirmed according to a preset matching judgment rule and a comparison result of the first weight and the second weight comprises: obtaining a difference between the first weight and the second weight judging whether an absolute value of the difference is less than a preset difference threshold; and determining that the information of the commodities to be settled is matched with the commodities to be confirmed under the condition that the absolute value of the difference is less than the preset difference threshold.

In some embodiments, the performing checkout processing according to the purchased commodity settlement information comprises: sending the purchased commodity settlement information to a first display device and a second display device, respectively, to display the purchased commodity settlement information to a customer and a clerk, respectively; and suspending the checkout processing under the condition that a settlement cancellation or settlement error message sent by either of the customer and the clerk with respect to the purchased commodity settlement information is received.

In some embodiments, the performing checkout processing according to the purchased commodity settlement information further comprises: receiving cost payment information sent by a customer terminal and generated according to the purchased commodity settlement information; sending cost payment completion information to the first display device and the second display device under the condition that it is determined that the cost payment information is correct, and setting the commodities to be settled to a paid status, so as to enable the commodities to be settled to pass the detection of a safety detection device; sending cost payment failure information to the first display device and the second display device under the condition that it is determined that the cost payment information is incorrect; acquiring the purchased commodity settlement information with successful cost payment and corresponding to the customer terminal, and obtaining a commodity category and shopping frequency based on the purchased commodity settlement information; determining a recommended commodity and purchase cycle according to the commodity category and the shopping frequency, and determining pushing time based on the purchase cycle; pushing the recommended commodity to the customer terminal based on the pushing time; and receiving commodity preferential information, judging whether the commodity preferential information is matched with the recommended commodity, and pushing the recommended commodity and the commodity preferential information to the customer terminal under the condition that the commodity preferential information is matched with the recommended commodity.

According to one or more embodiments of the present disclosure, there is provided a non-transitory computer-readable storage medium having stored thereon computer instructions which, when executed by one or more processors, cause the one or more processors to: obtain a monitoring image captured by an image capture device, wherein the monitoring image corresponds to commodities to be settled which are placed on a settlement counter; recognize the monitoring image to obtain information of the commodities to be settled; wherein the information of the commodities to be settled comprises: a category and quantity of the commodities to be settled; obtain a first weight corresponding to the commodities to be settled captured by a weight detection device arranged on the settlement counter, and obtain a second weight corresponding to the commodities to be settled based on the information of the commodities to be settled; judge whether the information of the commodities to be settled is matched with the commodities to be confirmed according to a preset matching judgment rule and a comparison result of the first weight and the second weight and obtain purchased commodity settlement information based on the information of the commodities to be settled under the condition that the information of the commodities to be settled is matched with the commodities to be confirmed, and perform checkout processing according to the purchased commodity settlement information, wherein the purchased commodity settlement information comprises the category, quantity and settlement price of the commodities to be settled.

In some embodiments, the recognizing the monitoring image to obtain information of the commodities to be settled comprises: determining a first position corresponding to the commodities to be settled and a second position corresponding to a coordinate scale on the settlement counter in the monitoring image; intercepting an image of the commodities to be settled and a coordinate scale image according to the first position and the second position in the monitoring image; determining size information of the commodities to be settled based on the coordinate scale image and the image of the commodities to be settled; recognizing a commodity type to which the commodities to be settled in the image of the commodities to be settled belong, and obtaining a quantity corresponding to each type of commodity to be settled; and determining the category of the commodities to be settled based on the size information of the commodities to be settled and the commodity type to which the commodities to be settled belong; wherein the determining a first position corresponding to the commodities to be settled and a second position corresponding to a coordinate scale on the settlement counter in the monitoring image comprises: determining the first position and the second position in the monitoring image with the use of an object detection model, wherein the object detection model comprises a convolutional neural network model based on a Faster RCNN algorithm.

In some embodiments, the recognizing a commodity type to which the commodities to be settled in the image of the commodities to be settled belong comprises: establishing a fully connected layer of a convolutional neural network by a Softmax function, and calculating a confidence level of the commodities to be settled belonging to each commodity type by the convolutional neural network; and taking the commodity type with the confidence level greater than a preset threshold as the commodity type of the commodities to be settled; wherein pooling layers are provided between convolutional layers of the convolutional neural network, and a batch normalization layer is provided behind the last convolutional layer.

Other features and advantages of the present disclosure will become clear through detailed descriptions of the illustrative embodiments of the present disclosure with reference to the following accompanying drawings.

BRIEF DESCRIPTION OF THE DRAWINGS

In order to more clearly illustrate the embodiments of the present disclosure or technical solutions in related arts, the drawings required to be used in the description of the embodiments or related arts will be briefly introduced below. Obviously, the drawings described below are only some of the embodiments of the present disclosure, and for those of ordinary skill in the art, other drawings can be obtained according to these drawings without making creative efforts.

DETAILED DESCRIPTION

The technical solutions in the embodiments of the present disclosure will be described clearly and completely with reference to the accompanying drawings in the embodiments of the present disclosure, and it is obvious that the embodiments described are only some of the embodiments of the present disclosure, rather than all embodiments. All other embodiments, which can be derived by those of ordinary skill in the art from the embodiments of the present disclosure without making any creative effort, shall fall within the protection scope of the present disclosure.

Technical solutions of the related arts have defects that: code scanning requires active cooperation of consumers to scan codes one by one to confirm products, which is tedious; RFID is high in cost, if each low-profit commodity is additionally provided with a RFID electronic tag, the cost is relatively high and certain environmental pollution will be caused, and when a customer quickly passes through a RFID settlement passage, tag detection may be missed due to over-high speed and the occlusion of the RFID tag, causing economic loss to supermarkets. Therefore, a new technical solution for shopping settlement is required.

Figure 1:
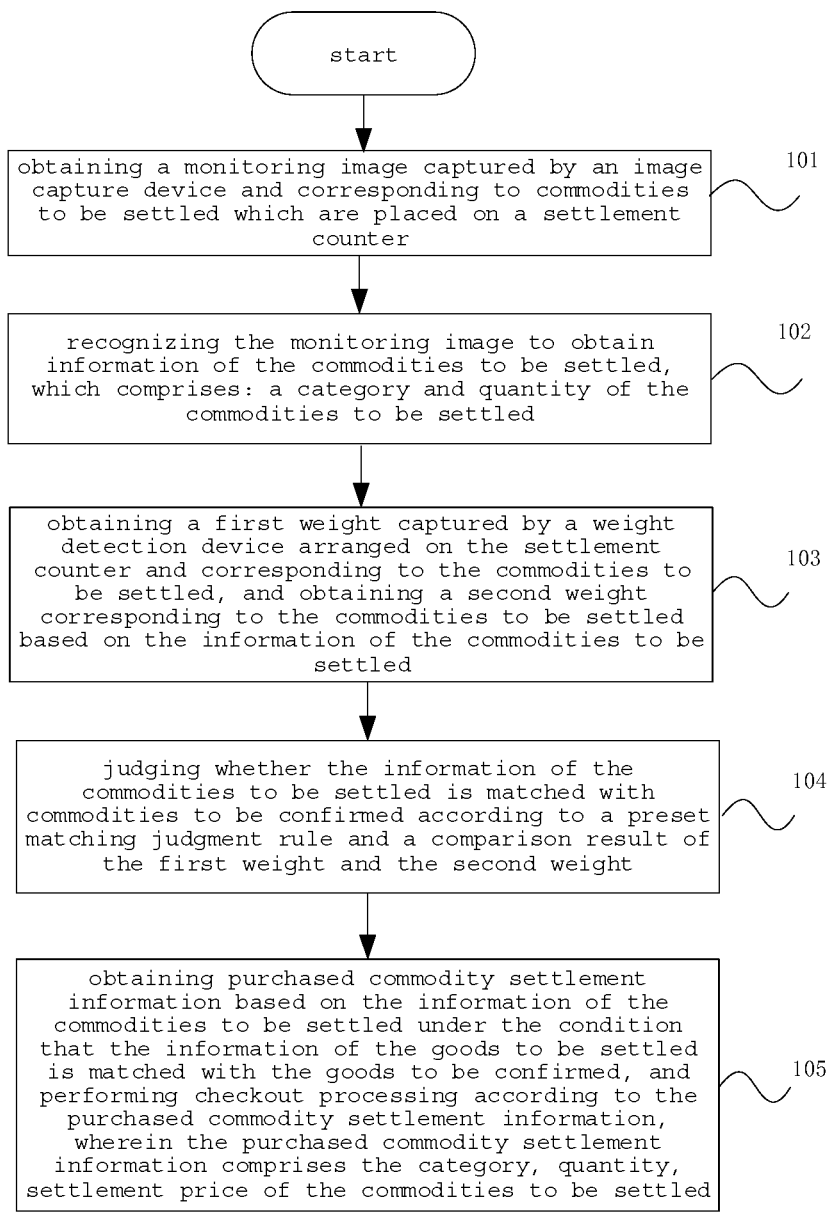
FIG. 1 is a schematic flow diagram of a self-service settlement method according to some embodiments of the present disclosure.

FIG. 1 is a schematic flow diagram of a self-service settlement method according to some embodiments of the present disclosure, and as shown in FIG. 1, the self-service settlement method comprises steps 101 to 105.

Step 101, obtaining a monitoring image captured by an image capture device and corresponding to commodities to be settled which are placed on a settlement counter.

The image capture device can be a camera, etc. The image capture device prearranged can collect images of the commodities to be settled which is placed on the settlement counter by a customer, and the commodities to be settled can be drinks, snacks and the like.

Step 102, recognizing the monitoring image to obtain information of the commodities to be settled, which comprises: a category and quantity of the commodities to be settled, etc.

The monitoring image can be recognized by using various image recognition technologies, and from the monitoring image, the category and the quantity of the commodities to be settled can be recognized, for example, a category of the commodities to be settled is 2 liters of Coca Cola, 5 liters of Luhua peanut oil and the like.

Step 103, obtaining a first weight captured by a weight detection device arranged on the settlement counter and corresponding to the commodities to be settled, and obtaining a second weight corresponding to the commodities to be settled based on the information of the commodities to be settled.

The weight detection device arranged on the settlement counter can be a weight sensor or the like. A unit weight corresponding to the recognized category of the commodities to be settled can be determined in a commodity database, and a second weight of the commodities to be settled which are selected by the customer can be calculated based on the unit weight and the quantity.

Step 104, judging whether the information of the commodities to be settled is matched with commodities to be confirmed according to a preset matching judgment rule and a comparison result of the first weight and the second weight.

Step 105, obtaining purchased commodity settlement information based on the information of the commodities to be settled under the condition that the information of the commodities to be settled is matched with the commodities to be confirmed, and performing checkout processing according to the purchased commodity settlement information, wherein the purchased commodity settlement information comprises the category, quantity, settlement price of the commodities to be settled, etc. A unit price corresponding to the recognized category of the commodities to be settled can be determined in the commodity database, and the settlement price of the commodities to be settled can be calculated from the unit price and the quantity.

The self-service settlement method in the above embodiment can be applied in shopping places such as convenience stores, supermarkets, is particularly suitable for scenes where there are a large number of customers purchasing a few commodities at one time (generally less than five commodities), which provides fast and accurate self-service settlement for the customers, reduces average time of a single transaction, decreases waiting time of customers and advances customer satisfaction.

Figure 2:
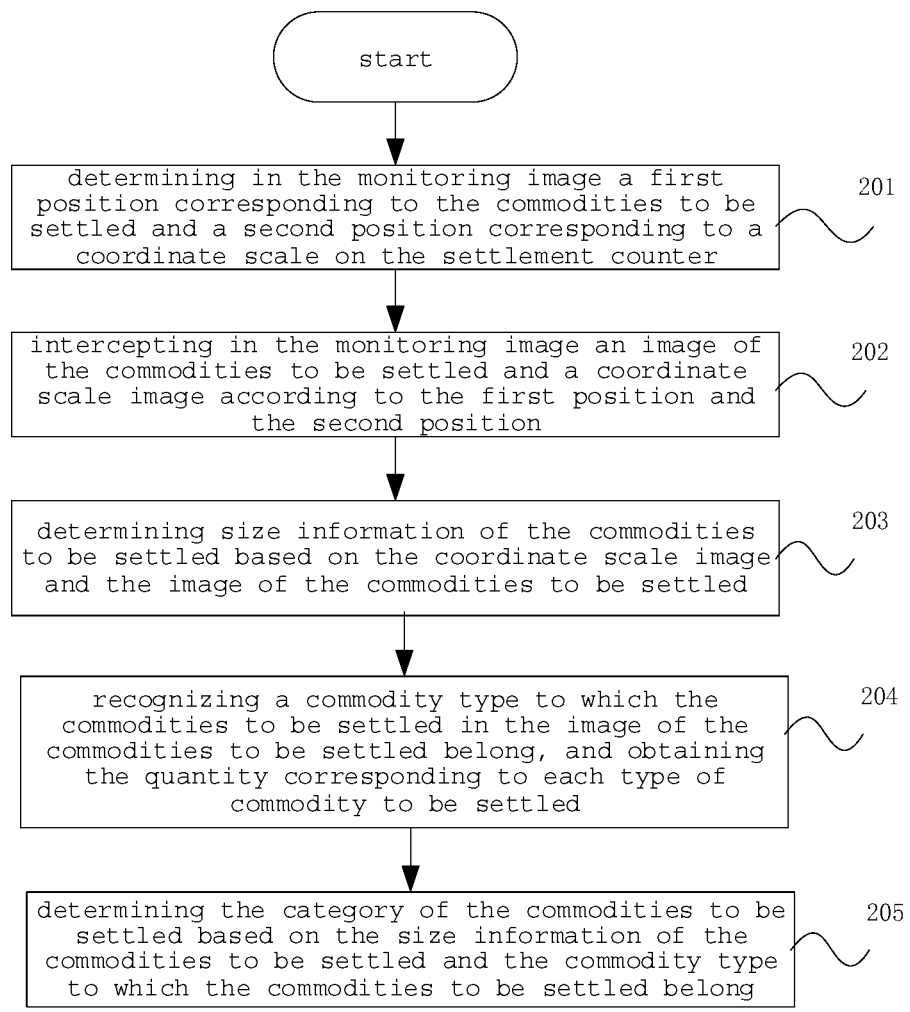
FIG. 2 is a schematic flow diagram of recognizing the monitoring image in the self-service settlement method according to some embodiments of the present disclosure.

In some embodiments, various image recognition methods can be used for recognizing the monitoring image and obtaining the information of the commodities to be settled. FIG. 2 is a schematic flow diagram of recognizing the monitoring image in the self-service settlement method according to some embodiments of the present disclosure, and as shown in FIG. 2, the self-service settlement method comprises steps 201 to 205.

Step 201, determining in the monitoring image a first position corresponding to the commodities to be settled and a second position corresponding to a coordinate scale on the settlement counter.

Step 202, intercepting in the monitoring image an image of the commodities to be settled and a coordinate scale image according to the first position and the second position.

The settlement counter is provided with the coordinate scale, for example, a graduated scale and the like are set on the settlement counter, so as to provide comparison reference for the size of the commodities to be calculated. When the commodities to be settled are placed on the settlement counter, the commodities to be settled and the coordinate scale are present in the monitoring image captured by the image capture device. The first position and the second position can be determined in the monitored image by using an object detection model.

The object detection model comprises: a convolutional neural network model based on a Faster RCNN (Faster Region Convolutional Neural Network) algorithm, etc. For example, the convolutional neural network model based on the Faster RCNN algorithm is constructed, position information, images and classification information of bags, shoes, clothes and trousers and the like in the existing monitoring images are obtained in advance and marked manually as training data sets, the convolutional neural network model based on the Faster RCNN algorithm is detected and trained, so that the object detection network model is obtained.

By using a RPN (Candidate region Network) network of the object detection network model to extract candidate regions having objects (the commodities to be settled and the coordinate scale) from the monitoring image, and by using a ROIpooling (Region of Interest Pooling) layer of the object detection network model to extract feature vectors from convolution feature maps of the monitoring image, the feature vector of each candidate region is sent into a classifier for classification, to judge a type to which the object belongs and determine coordinates of a rectangular region containing the object, so that the image of the commodities to be settled and the coordinate scale image are intercepted in the monitoring image.

Step 203, determining size information of the commodities to be settled based on the coordinate scale image and the image of the commodities to be settled.

Step 204, recognizing a commodity type to which the commodities to be settled in the image of the commodities to be settled belong, and obtaining the quantity corresponding to each type of commodity to be settled.

The commodity type to which the commodities to be settled in the image of the commodities to be settled belong and the quantity thereof can be recognized through the neural network model, and the size information of the commodities to be settled is determined based on the coordinate scale image and the image of the commodities to be settled. For example, a fully connected layer of a convolutional neural network is established by a Softmax function, features in the coordinate scale image and the image of commodities to be settled are extracted, the features are compared with features of each type of commodity, a confidence level of the image of the commodities to be settled belonging to each commodity type is calculated by the convolutional neural network, the commodity type with the confidence level greater than a preset threshold is taken as the type of the commodities to be settled, and the quantity corresponding to each type of commodity to be settled is counted.

Pooling layers, which may be a max pooling (maximum pooling) layer, can be provided between convolutional layers of the convolutional neural network, which can effectively reduce sampling rate of the image, thereby improving recognition efficiency. Instead of using dropout to discard a neural network unit, or using a batch normalization layer layer by layer, the batch normalization layer is provided only behind the last convolutional layer, which can accelerate the convergence speed of recognition and avoid gradient disappearance, thereby improving recognition efficiency and accuracy.

Step 205, determining the category of the commodities to be settled based on the size information of the commodities to be settled and the commodity type to which the commodities to be settled belong.

The commodities to be settled in the image of the commodities to be settled and the coordinate scale in the coordinate scale image can be recognized through the neural network model, and according to a corresponding relation between the coordinate scale and the size of the commodities to be settled, a real size of the commodities to be settled is obtained. For example, the commodity type of the commodities to be settled is recognized through the neural network model as potato chips, and based on the corresponding relation between the coordinate scale and the size of the commodities to be settled, the actual size of the commodities to be settled can be obtained, and according to commodity size information in the commodity database, the category of the commodities to be settled is determined as a large pack of potato chips.

In some embodiments, a commodity unit weight corresponding to the category of the commodities to be settled is captured, and the second weight is captured according to the commodity unit weight and the quantity of the commodities to be settled. For example, if it is recognized that the category of the commodities to be settled is a large pack of potato chips and the quantity is two, and according to commodity weight information in the commodity database, it is derived that the unit weight of the large pack of potato chips is 100 g, so that it is determined that the second weight is 100*2=200 g.

Figure 3:
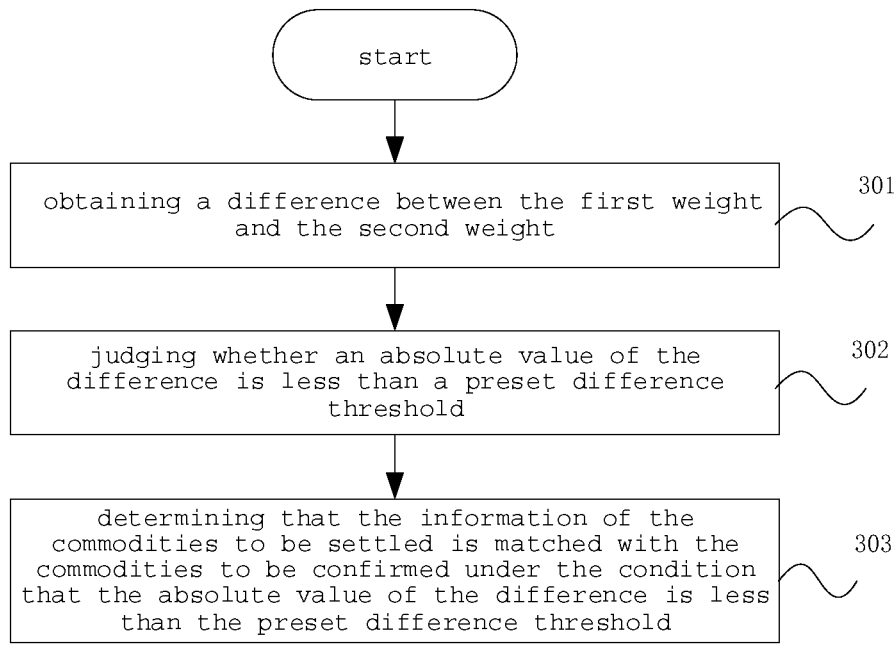
FIG. 3 is a schematic flow diagram of judging whether the information of the commodities to be settled is matched with the commodities to be confirmed in the self-service settlement method according to some embodiments of the present disclosure.

FIG. 3 is a schematic flow diagram of judging whether the information of the commodities to be settled is matched with the commodities to be confirmed in the self-service settlement method according to some embodiments of the present disclosure, and as shown in FIG. 3, the self-service settlement method comprises steps 301 to 303.

Step 301, obtaining a difference between the first weight and the second weight.

Step 302, judging whether an absolute value of the difference is less than a preset difference threshold.

Step 303, determining that the information of the commodities to be settled is matched with the commodities to be confirmed under the condition that the absolute value of the difference is less than the preset difference threshold.

For example, a preset difference threshold is 5 g, the first weight captured by a weight detection device arranged on the settlement counter is 300 g, and the second weight is 200 g, then the absolute value of the difference between the first weight and the second weight is 100 g, which is greater than the difference threshold of 5 g, so that it is determined that the information of commodities to be settled is not matched with the commodities to be confirmed, and an error message can be sent to a customer, a clerk, etc. When receiving the error message, the clerk can check the commodities to be settled.

In some embodiments, the purchased commodity settlement information can be sent to the first display device and the second display device, respectively, so as to display the purchased commodity settlement information to the customer and the clerk, respectively. If a settlement cancellation or settlement error message sent by either of the customer and the clerk with respect to the purchased commodity settlement information is received, the checkout processing is suspended. The settlement process can be changed from the traditional settlement of a clerk scanning one-dimensional bar codes into "commodity detection and recognition settlement+verification settlement assisted by a clerk", which avoids the tedious process of scanning commodities one by one, and greatly reduces settlement time.

The image capture device can continuously detect the settlement counter, perform a recognition detection algorithm on the monitoring image every a preset number of image frames (for example, 3 image frames), to obtain the information of the commodities to be settled, and judge whether the information of the commodities to be settled is matched with the commodities to be confirmed, to obtain the purchased commodity settlement information, which realizes real time synchronization effect between the settlement counter and the purchased commodity settlement information displayed in the display device.

For example, when five commodities A, B, C, D, E are placed on the settlement counter by a customer, the first display device and the second display device can display purchased commodity settlement information of the five commodities in real time, and when the commodities B and C are removed from the settlement counter, the first display device and the second display device will be updated as the purchased commodity settlement information of the three commodities A, D, E in real time. The customer can confirm the purchased commodity settlement information on the first display device, or suspend this checkout. The clerk can confirm the purchased commodity settlement information on the second display device, and if a settlement error is found, suspend settlement and payment, place the commodities to be settled again, and recognize the commodities to be settled, etc.

Figure 4:
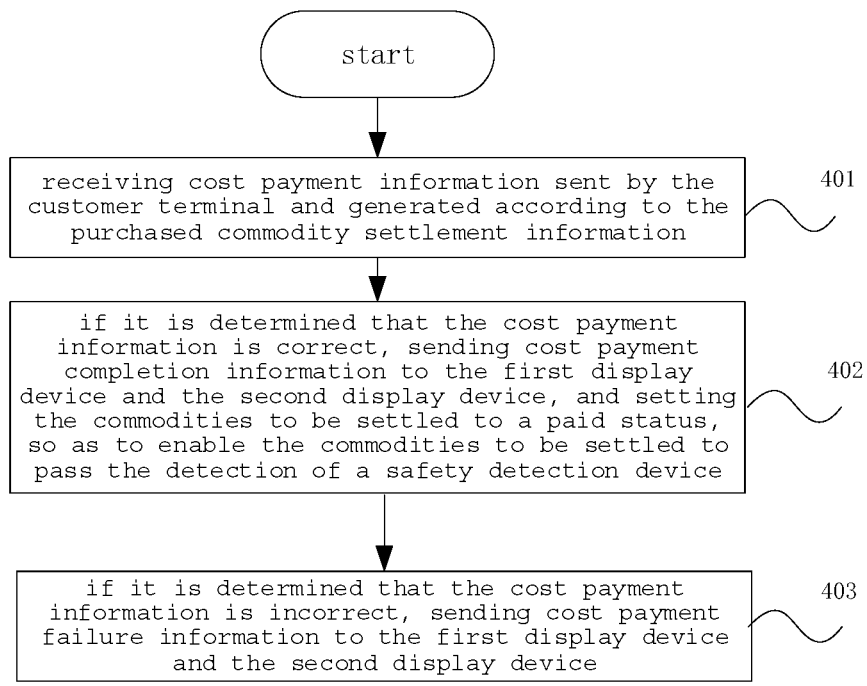
FIG. 4 is a schematic flow diagram of the cost payment processing in the self-service settlement method according to some embodiments of the present disclosure.

FIG. 4 is a schematic flow diagram of the cost payment processing in the self-service settlement method according to some embodiments of the present disclosure, and as shown in FIG. 4, the self-service settlement method comprises steps 401 to 403.

Step 401, receiving cost payment information sent by the customer terminal and generated according to the purchased commodity settlement information.

The customer can pay in many ways, for example, pay by card, etc. A payment two-dimensional code can also be generated based on the purchased commodity settlement information, and displayed on the first display device, or the purchased commodity settlement information can be sent to the customer terminal, so that the customer terminal can perform online payment by scanning the payment two-dimensional code, or perform online payment based on the purchased commodity settlement information. The customer terminal can be the customer's mobile phone or the like.

Step 402, if it is determined that the cost payment information is correct, sending cost payment completion information to the first display device and the second display device. The commodities to be settled are set to a paid status, so as to enable the commodities to be settled to pass the detection of the safety detection device and start next self-service settlement.

For example, if it is determined that payment information of the customer is correct, processing such as fee deduction is performed, and status information of the commodities to be settled is set to a settled status in a commodity database, so that the customer can carry the commodities to be settled and pass the detection of the safety detection device.

Step 403, if it is determined that the cost payment information is incorrect, sending cost payment failure information to the first display device and the second display device. If the commodities to be settled is not recognized within a preset time, the current commodity recognition will be ended, and a next self-service settlement will be started.

Figure 5:
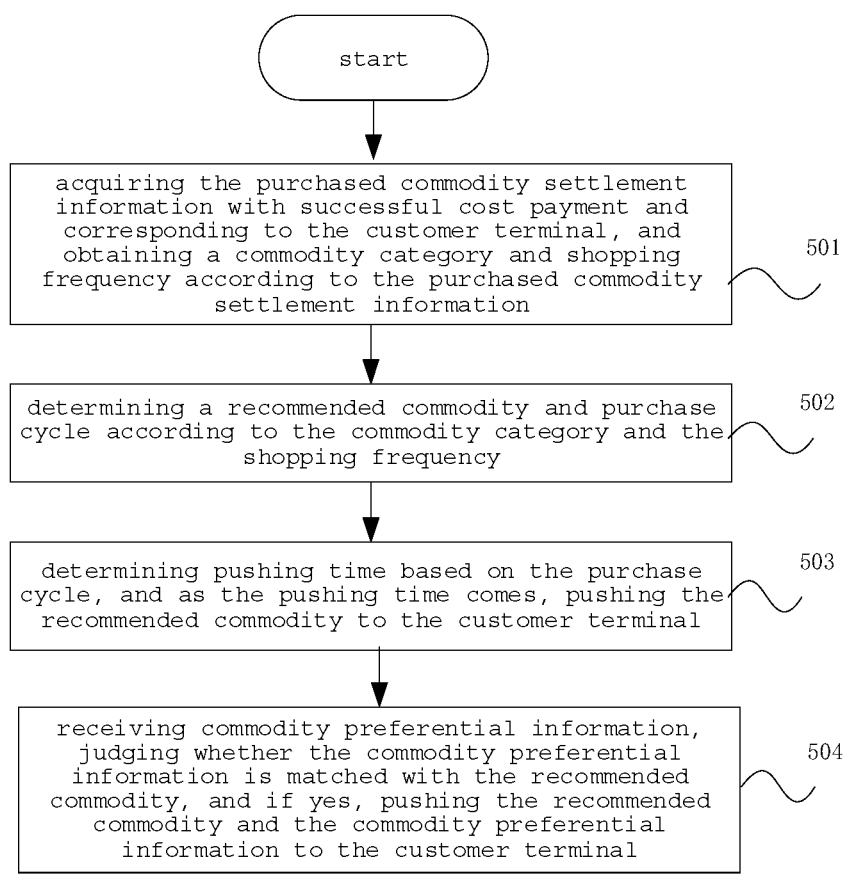
FIG. 5 is a schematic flow diagram of recommending a commodity in the self-service settlement method according to some embodiments of the present disclosure.

FIG. 5 is a schematic flow diagram of recommending a commodity in the self-service settlement method according to some embodiments of the present disclosure, and as shown in FIG. 5, the self-service settlement method comprises steps 501 to 504.

Step 501, acquiring the purchased commodity settlement information with successful cost payment and corresponding to the customer terminal, and obtaining a commodity category and shopping frequency according to the purchased commodity settlement information.

Step 502, determining a recommended commodity and purchase cycle according to the commodity category and the shopping frequency, and determining pushing time based on the purchase cycle.

Step 503, pushing the recommended commodity to the customer terminal based on the pushing time.

Step 504, receiving commodity preferential information, judging whether the commodity preferential information is matched with the recommended commodity, and if yes, pushing the recommended commodity and the commodity preferential information to the customer terminal.

For example, after a customer pays through a mobile phone, an association between the mobile phone (e.g., mobile phone number) and purchased commodity settlement information is established. According to the historical purchased commodity settlement information, information such as commodities purchased by the customer and frequency corresponding to this mobile phone, is analyzed, to determine a shopping category and a shopping cycle of the customer. For example, if the shopping category is rice and the shopping cycle is 20 days, the rice is taken as a recommended commodity and pushed once every 20 days or so. As the pushing time comes, the recommended rice information is pushed to the customer's mobile phone. If shopping preferential information received is promotion information of a type of rice, the rice information and the promotion information are pushed to the customer's mobile phone, which can achieve intelligent advertising recommendation.

Figure 6:
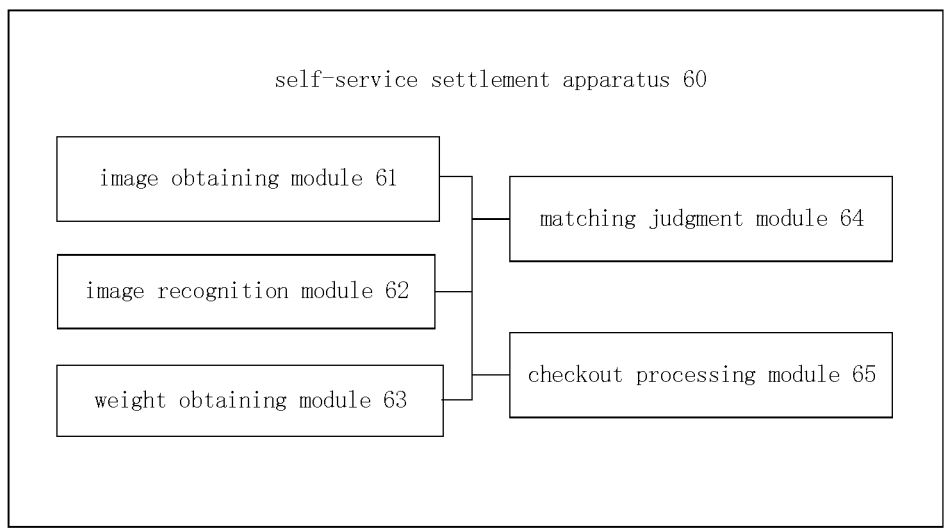
FIG. 6 is a schematic block diagram of a self-service settlement apparatus according to some embodiments of the present disclosure.

In some embodiments, as shown in FIG. 6, the present disclosure provides a self-service settlement apparatus 60 comprising: an image obtaining module 61, an image recognition module 62, a weight obtaining module 63, a matching judgment module 64, and a checkout processing module 65.

The image obtaining module 61 obtains a monitoring image captured by an image capture device and corresponding to commodities to be settled which are placed on a settlement counter. The image recognition module 62 recognizes the monitoring image to obtain information of the commodities to be settled; wherein the information of the commodities to be settled comprises: a category and quantity of the commodities to be settled, etc. The weight obtaining module 63 obtains a first weight captured by a weight detection device arranged on the settlement counter and corresponding to the commodities to be settled, and obtains a second weight corresponding to the commodities to be settled based on the information of the commodities to be settled.

The matching judgment module 64 judges whether the information of the commodities to be settled is matched with the commodities to be confirmed according to a preset matching judgment rule and a comparison result of the first weight and the second weight. If the information of the commodities to be settled is matched with the commodities to be confirmed, the checkout processing module 65 obtains purchased commodity settlement information based on the information of the commodities to be settled, and performs checkout processing according to the purchased commodity settlement information; wherein the purchased commodity settlement information comprises: the category, quantity, settlement price of the commodities to be settled, etc.

Figure 8:
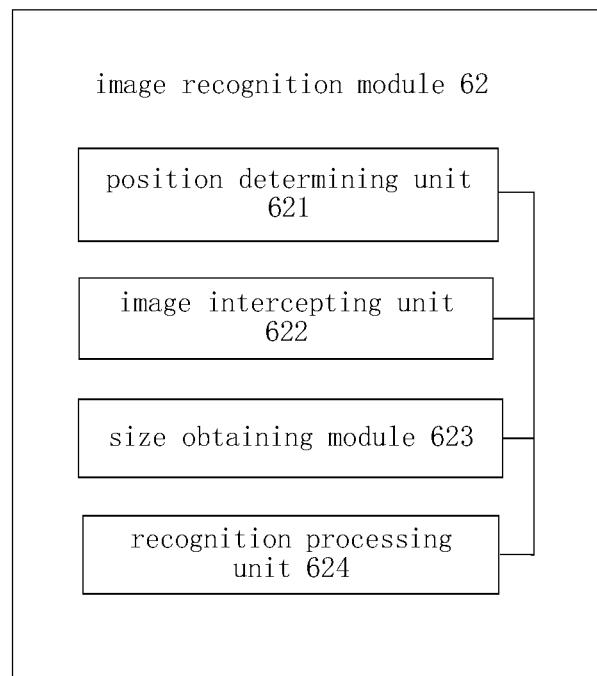
FIG. 8 is a schematic block diagram of an image recognition module in the self-service settlement apparatus according to some embodiments of the present disclosure.

In some embodiments, as shown in FIG. 8, the image recognition module 62 comprises: a position determining unit 621, an image intercepting unit 622, a size obtaining module 623, and a recognition processing unit 624.

The position determining unit 621 determines in the monitoring image a first position corresponding to the commodities to be settled and a second position corresponding to a coordinate scale on the settlement counter. The image intercepting unit 622 intercepts in the monitoring image an image of the commodities to be settled and a coordinate scale image according to the first position and the second position. The size obtaining module 623 determines size information of the commodities to be settled based on the coordinate scale image and the image of the commodities to be settled. The recognition processing unit 624 recognizes a commodity type to which the commodities to be settled in the image of the commodities to be settled belong, and obtains a quantity corresponding to each type of commodity to be settled. The recognition processing unit 624 determines the category of the commodities to be settled based on the size information of the commodities to be settled and the commodity type to which the commodities to be settled belong.

The position determining unit 621 determines in the monitoring image the first position and the second position with the use of an object detection model; wherein the object detection model comprises: a convolutional neural network model based on a Faster RCNN algorithm, and the like. The recognition processing unit 624 establishes a fully connected layer of a convolutional neural network by a Softmax function, and calculates a confidence level of the commodities to be settled belonging to each commodity type by the convolutional neural network. The recognition processing unit 624 takes the commodity type with the confidence level greater than a preset threshold as the commodity type of the commodities to be settled. Pooling layers are provided between convolutional layers of the convolution neural network, and a batch standardization layer is provided behind the last convolutional layer.

In some embodiments, the weight obtaining module 63 acquires a commodity unit weight corresponding to the category of the commodities to be settled, and obtains the second weight according to the commodity unit weight and the quantity of the commodities to be settled. The matching judgment module 64 obtains a difference between the first weight and the second weight, judges whether an absolute value of the difference is less than a preset difference threshold, and if yes, determines that the information of the commodities to be settled is matched with the commodities to be confirmed.

The checkout processing module 65 sends the purchased commodity settlement information to a first display device and a second display device, respectively, to display the purchased commodity settlement information to a customer and a clerk, respectively. The checkout processing module 65 suspends the checkout processing if a settlement cancellation or settlement error message sent by either of the customer and the clerk with respect to the purchased commodity settlement information is received.

The checkout processing module 65 receives cost payment information sent by a customer terminal and generated from the purchased commodity settlement information, and if it is determined that the cost payment information is correct, cost payment completion information is sent to the first display device and the second display device, and the commodities to be settled is set to a paid status, so as to enable the commodities to be settled to pass the detection of a safety detection device. If it is determined that the cost payment information is incorrect, the checkout processing module 65 sends cost payment failure information to the first display device and the second display device.

Figure 7:
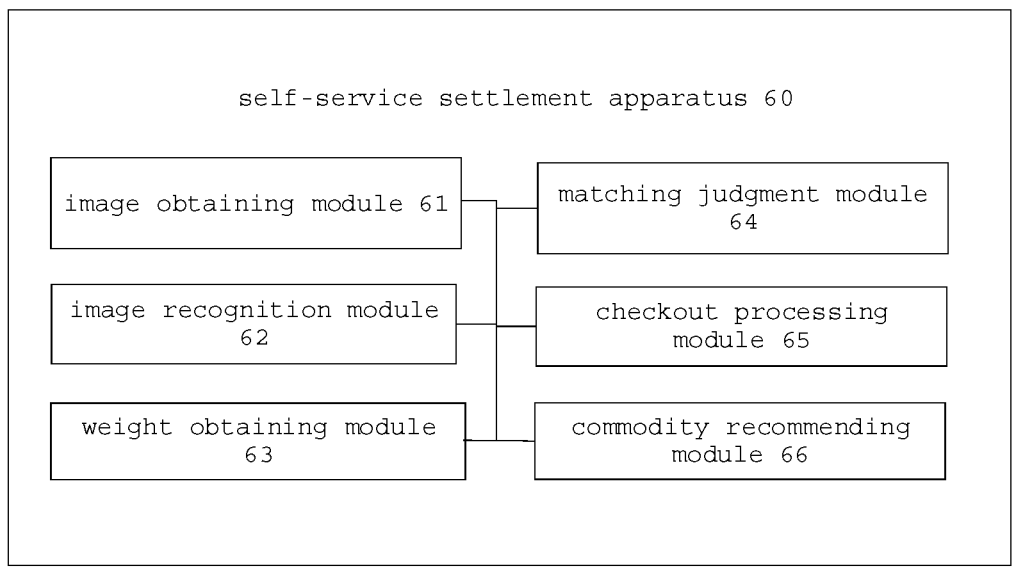
FIG. 7 is a schematic block diagram of a self-service settlement apparatus according to other embodiments of the present disclosure.

In some embodiments, as shown in FIG. 7, the commodity recommending module 66 acquires the purchased commodity settlement information with successful cost payment and corresponding to the customer terminal, and obtains a commodity category and shopping frequency according to this purchased commodity settlement information. The commodity recommending module 66 determines a recommended commodity and a purchase cycle according to the commodity category and the shopping frequency, and determines pushing time based on the purchase cycle; and pushes the recommended commodity to the customer terminal based on the pushing time. The commodity recommending module 66 receives commodity preferential information, judges whether the commodity preferential information is matched with the recommended commodity, and if yes, pushes the recommended commodity and the commodity preferential information to the customer terminal.

Figure 9:
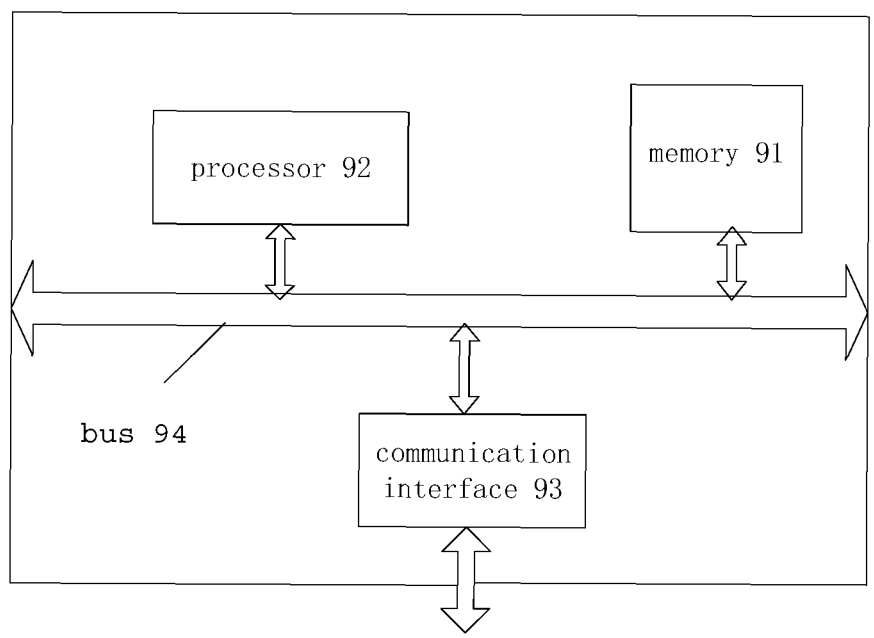
FIG. 9 is a schematic block diagram of a self-service settlement apparatus according to still other embodiments of the present disclosure.

FIG. 9 is a schematic block diagram of a self-service settlement apparatus according to still other embodiments of the present disclosure. As shown in FIG. 9, the apparatus can comprise a memory 91, a processor 92, a communication interface 93, and a bus 94. The memory 91 is configured to store instructions, the processor 92 is coupled to the memory 91, and the processor 92 is configured to implement the self-service settlement method described above based on the execution of the instructions stored in the memory 91.

The memory 91 can be a high-speed RAM memory, a non-volatile memory, or the like, and also be a memory array. The storage 91 can also be partitioned into blocks and the blocks can be combined into virtual volumes according to certain rules. The processor 92 can be a central processing unit CPU, or an Application Specific Integrated Circuit ASIC, or one or more integrated circuits configured to implement the self-service settlement method of the present disclosure.

In some embodiments, the present disclosure further provides a computer-readable storage medium, wherein the computer-readable storage medium has stored thereon computer instructions, which when executed by a processor, implement the self-service settlement method as mentioned in any of the above embodiments. As will be appreciated by those skilled in the art, the embodiments of the present disclosure can be provided as a method, apparatus, or computer program product. Accordingly, the present disclosure can take the form of an entirely hardware embodiment, an entirely software embodiment or an embodiment combining software and hardware aspects. Furthermore, the present disclosure can take the form of a computer program product embodied on one or more computer-usable non-transitory storage media (including, but not limited to, disk storage, CD-ROM, optical storage, and so forth) having computer-usable program code therein.

The present disclosure is described with reference to flow diagrams and/or block diagrams of the method, apparatus (system) and computer program product according to the embodiments of the present disclosure. It will be understood that each flow and/or block of the flow diagrams and/or block diagrams, and combinations of flows and/or blocks in the flow diagrams and/or block diagrams, can be implemented by computer program instructions. These computer program instructions can be provided to a processor of a general purpose computer, special purpose computer, embedded processor, or other programmable data processing apparatus to produce a machine, such that by the instructions, which are executed by the processor of the computer or other programmable data processing apparatus, a means for implementing functions specified in one or more flows of the flow diagrams and/or one or more blocks of the block diagrams is created.

According to the self-service settlement method, apparatus and storage medium of the above embodiments, by determining the information of the commodities to be detected in combination with the image recognition technology and the weight detection technology, fast self-service settlement can be achieved, which reduces an average time length of a single transaction, improves settlement efficiency, decreases customer's waiting time for settlement and improves shopping experience of the customer; a supervision function can be set, which effectively avoids economic loss caused by wrong settlement; neither extra auxiliary verification settlement, nor tools such as RFID price tags are needed, which results in low cost; the number of cashier staff can be reduced, which lowers operation cost; continuous contact with customers is established through an intelligent advertising technology, which not only raises customer experience, but also increases supermarket sales amount.

The method and system of the present disclosure can be implemented in a number of ways. For example, the method and system of the present disclosure can be implemented through software, hardware, firmware, or any combination of software, hardware, and firmware. The above-described order for the steps of the method is for illustration only, and the steps of the method of the present disclosure are not limited to the order specifically described above unless specifically stated otherwise. Further, in some embodiments, the present disclosure may also be embodied as programs recorded in a recording medium, and these programs comprise machine-readable instructions for implementing the method according to the present disclosure. Thus, the present disclosure further covers a recording medium storing the programs for executing the method according to the present disclosure.

The description of the present disclosure is given for purposes of illustration and description, but is not intended to be exhaustive or limits the present disclosure in the form disclosed. Many modifications and variations will be apparent to those of ordinary skill in this art. The embodiments were chosen and described in order to best explain the principles and the practical applications of the present disclosure, and to enable those of ordinary skill in the art to understand the present disclosure, thereby designing various embodiments with various modifications suitable for a particular use.

What is claimed is:

1. A self-service settlement method, comprising:
    obtaining, by processing circuitry, a monitoring image captured by an image capture device, wherein the monitoring image corresponds to commodities to be settled which are placed on a settlement counter;
    recognizing, by the processing circuitry, the monitoring image to obtain information of the commodities to be settled, wherein the information of the commodities to be settled comprises a category and quantity of the commodities to be settled, wherein the recognizing step further comprises
        determining a first position corresponding to the commodities to be settled and a second position corresponding to a coordinate scale on the settlement counter in the monitoring image using an object detection model;
        intercepting an image of the commodities to be settled and a coordinate scale image according to the first position and the second position in the monitoring image;
        recognizing the commodities to be settled in the image of the commodities to be settled and the coordinate scale in the coordinate scale image with the use of an neural network model, and determining size information of the commodities to be settled according to a corresponding relation between the coordinate scale and the size of the commodities to be settled;
        recognizing a commodity type to which the commodities to be settled in the image of the commodities to be settled belong, and obtaining a quantity corresponding to each type of commodity to be settled; and
        determining the category of the commodities to be settled based on the size information of the commodities to be settled and the commodity type to which the commodities to be settled belong;
    obtaining, by the processing circuitry, a first weight corresponding to the commodities to be settled, captured by a weight detection device arranged on the settlement counter, and obtaining a second weight corresponding to the commodities to be settled based on the information of the commodities to be settled;
    judging, by the processing circuitry, whether the information of the commodities to be settled is matched with commodities to be confirmed according to a preset matching judgment rule and a comparison result of the first weight and the second weight; and
    obtaining, by the processing circuitry, purchased commodity settlement information based on the information of the commodities to be settled under a condition that the information of the commodities to be settled is matched with the commodities to be confirmed, and performing checkout processing according to the purchased commodity settlement information,
    wherein the purchased commodity settlement information comprises the category, quantity, and settlement price of the commodities to be settled, and
    wherein the performing checkout processing according to the purchased commodity settlement information comprises:
        sending the purchased commodity settlement information to a first display device and a second display device, respectively, to display the purchased commodity settlement information to a customer and a clerk, respectively;
        receiving cost payment information sent by a customer terminal and generated according to the purchased commodity settlement information;
        sending cost payment completion information to the first display device and the second display device under the condition that it is determined that the cost payment information is correct, and setting the commodities to be settled to a paid status, so as to enable the commodities to be settled to pass the detection of a safety detection device; and
        sending cost payment failure information to the first display device and the second display device under the condition that it is determined that the cost payment information is incorrect.

2. The self-service settlement method according to claim 1, wherein the object detection model comprises a convolutional neural network model based on a Faster RCNN algorithm.

3. The self-service settlement method according to claim 1, wherein the recognizing the commodity type to which the commodities to be settled in the image of the commodities to be settled belong comprises:
    establishing a fully connected layer of a convolutional neural network by a Softmax function, and calculating a confidence level of the commodities to be settled belonging to each commodity type by the convolutional neural network; and
    taking the commodity type with the confidence level greater than a preset threshold as the commodity type of the commodities to be settled.

4. The self-service settlement method according to claim 3, wherein
pooling layers are provided between convolutional layers of the convolutional neural network, and a batch normalization layer is provided behind a last convolutional layer.

5. The self-service settlement method according to claim 1, wherein the obtaining a second weight corresponding to the commodities to be settled based on the information of the commodities to be settled comprises:
acquiring a commodity unit weight corresponding to the category of the commodities to be settled; and
obtaining the second weight according to the commodity unit weight and the quantity of the commodities to be settled.

6. The self-service settlement method according to claim 5, wherein the judging whether the information of the commodities to be settled is matched with the commodities to be confirmed according to a preset matching judgment rule and a comparison result of the first weight and the second weight comprises:
obtaining a difference between the first weight and the second weight;
judging whether an absolute value of the difference is less than a preset difference threshold; and
determining that the information of the commodities to be settled is matched with the commodities to be confirmed under the condition that the absolute value of the difference is less than the preset difference threshold.

7. The self-service settlement method according to claim 1, wherein the performing checkout processing according to the purchased commodity settlement information comprises:
suspending the checkout processing under the condition that a settlement cancellation or settlement error message sent by either of the customer and the clerk with respect to the purchased commodity settlement information is received.

8. The self-service settlement method according to claim 7, further comprising:
acquiring the purchased commodity settlement information with successful cost payment and corresponding to the customer terminal, and obtaining a commodity category and shopping frequency based on the purchased commodity settlement information;
determining a recommended commodity and purchase cycle according to the commodity category and the shopping frequency, and determining pushing time based on the purchase cycle;
pushing the recommended commodity to the customer terminal based on the pushing time; and
receiving commodity preferential information, judging whether the commodity preferential information is matched with the recommended commodity, and pushing the recommended commodity and the commodity preferential information to the customer terminal under the condition that the commodity preferential information is matched with the recommended commodity.

9. A self-service settlement apparatus, comprising:
a processor; and a memory coupled to the processor, storing program instructions which, when executed by the processor, cause the processor to:
obtain a monitoring image captured by an image capture device, wherein the monitoring image corresponds to commodities to be settled which are placed on a settlement counter;
recognize the monitoring image to obtain information of the commodities to be settled, wherein the information of the commodities to be settled comprises a category and quantity of the commodities to be settled, wherein the recognizing the monitoring image to obtain information of the commodities to be settled includes
determining a first position corresponding to the commodities to be settled and a second position corresponding to a coordinate scale on the settlement counter in the monitoring image using an object detection model;
intercepting an image of the commodities to be settled and a coordinate scale image according to the first position and the second position in the monitoring image;
recognizing the commodities to be settled in the image of the commodities to be settled and the coordinate scale in the coordinate scale image with the use of an neural network model, and determining size information of the commodities to be settled according to a corresponding relation between the coordinate scale and the size of the commodities to be settled;
recognizing a commodity type to which the commodities to be settled in the image of the commodities to be settled belong, and obtaining a quantity corresponding to each type of commodity to be settled; and
determining the category of the commodities to be settled based on the size information of the commodities to be settled and the commodity type to which the commodities to be settled belong;
obtain a first weight corresponding to the commodities to be settled captured by a weight detection device arranged on the settlement counter, and obtain a second weight corresponding to the commodities to be settled based on the information of the commodities to be settled;
judge whether the information of the commodities to be settled is matched with commodities to be confirmed according to a preset matching judgment rule and comparison result of the first weight and the second weight; and
obtain purchased commodity settlement information based on the information of the commodities to be settled under a condition that the information of the commodities to be settled is matched with the commodities to be confirmed, and perform checkout processing according to the purchased commodity settlement information,
wherein the purchased commodity settlement information comprises the category, quantity, and settlement price of the commodities to be settled, and
wherein the performing checkout processing according to the purchased commodity settlement information comprises:
sending the purchased commodity settlement information to a first display device and a second display device, respectively, to display the purchased commodity settlement information to a customer and a clerk, respectively;
receiving cost payment information sent by a customer terminal and generated according to the purchased commodity settlement information;
sending cost payment completion information to the first display device and the second display device under the condition that it is determined that the cost payment information is correct, and setting the commodities to be settled to a paid status, so as to enable the commodities to be settled to pass the detection of a safety detection device; and sending cost payment failure information to the first display device and the second display device under the condition that it is determined that the cost payment information is incorrect.

10. A non-transitory computer-readable storage medium having stored thereon computer instructions which, when executed by one or more processors, cause the one or more processors to:

obtain a monitoring image captured by an image capture device, wherein the monitoring image corresponds to commodities to be settled which are placed on a settlement counter;

recognize the monitoring image to obtain information of the commodities to be settled, wherein the information of the commodities to be settled comprises a category and quantity of the commodities to be settled, wherein the recognizing the monitoring image to obtain information of the commodities to be settled includes determining a first position corresponding to the commodities to be settled and a second position corresponding to a coordinate scale on the settlement counter in the monitoring image using an object detection model;

intercepting an image of the commodities to be settled and a coordinate scale image according to the first position and the second position in the monitoring image;

recognizing the commodities to be settled in the image of the commodities to be settled and the coordinate scale in the coordinate scale image with the use of an neural network model, and determining size information of the commodities to be settled according to a corresponding relation between the coordinate scale and the size of the commodities to be settled;

recognizing a commodity type to which the commodities to be settled in the image of the commodities to be settled belong, and obtaining a quantity corresponding to each type of commodity to be settled; and determining the category of the commodities to be settled based on the size information of the commodities to be settled and the commodity type to which the commodities to be settled belong;

obtain a first weight corresponding to the commodities to be settled captured by a weight detection device arranged on the settlement counter, and obtain a second weight corresponding to the commodities to be settled based on the information of the commodities to be settled;

judge whether the information of the commodities to be settled is matched with commodities to be confirmed according to a preset matching judgment rule and a comparison result of the first weight and the second weight; and obtain purchased commodity settlement information based on the information of the commodities to be settled under a condition that the information of the commodities to be settled is matched with the commodities to be confirmed, and perform checkout processing according to the purchased commodity settlement information, wherein the purchased commodity settlement information comprises the category, quantity, and settlement price of the commodities to be settled, and wherein the performing checkout processing according to the purchased commodity settlement information comprises:

sending the purchased commodity settlement information to a first display device and a second display device, respectively, to display the purchased commodity settlement information to a customer and a clerk, respectively;

receiving cost payment information sent by a customer terminal and generated according to the purchased commodity settlement information;

sending cost payment completion information to the first display device and the second display device under the condition that it is determined that the cost payment information is correct, and setting the commodities to be settled to a paid status, so as to enable the commodities to be settled to pass the detection of a safety detection device; and sending cost payment failure information to the first display device and the second display device under the condition that it is determined that the cost payment information is incorrect.

11. The self-service settlement apparatus of claim 9, wherein the object detection model comprises a convolutional neural network model based on a Faster RCNN algorithm.

12. The self-service settlement apparatus of claim 11, wherein the recognizing a commodity type to which the commodities to be settled in the image of the commodities to be settled belong comprises:

establishing a fully connected layer of a convolutional neural network by a Softmax function, and calculating a confidence level of the commodities to be settled belonging to each commodity type by the convolutional neural network; and taking the commodity type with the confidence level greater than a preset threshold as the commodity type of the commodities to be settled;

wherein pooling layers are provided between convolutional layers of the convolutional neural network, and a batch normalization layer is provided behind the last convolutional layer.

13. The self-service settlement apparatus of claim 9, wherein the obtaining a second weight corresponding to the commodities to be settled based on the information of the commodities to be settled comprises:

acquiring a commodity unit weight corresponding to the category of the commodities to be settled; and obtaining the second weight according to the commodity unit weight and the quantity of the commodities to be settled.

14. The self-service settlement apparatus of claim 13, wherein the judging whether the information of the commodities to be settled is matched with the commodities to be confirmed according to a preset matching judgment rule and a comparison result of the first weight and the second weight comprises:

obtaining a difference between the first weight and the second weight;

judging whether an absolute value of the difference is less than a preset difference threshold; and determining that the information of the commodities to be settled is matched with the commodities to be confirmed under the condition that the absolute value of the difference is less than the preset difference threshold.

15. The self-service settlement apparatus of claim 9, wherein the performing checkout processing according to the purchased commodity settlement information comprises:
   suspending the checkout processing under the condition that a settlement cancellation or settlement error message sent by either of the customer and the clerk with respect to the purchased commodity settlement information is received.

16. The self-service settlement apparatus of claim 15, wherein the processor is further configured to
   acquire the purchased commodity settlement information with successful cost payment and corresponding to the customer terminal, and obtaining a commodity category and shopping frequency based on the purchased commodity settlement information;
   determine a recommended commodity and purchase cycle according to the commodity category and the shopping frequency, and determine pushing time based on the purchase cycle;
   push the recommended commodity to the customer terminal based on the pushing time; and
   receive commodity preferential information, judge whether the commodity preferential information is matched with the recommended commodity, and push the recommended commodity and the commodity preferential information to the customer terminal under the condition that the commodity preferential information is matched with the recommended commodity.

17. The non-transitory computer readable storage medium of claim 10,
   wherein the object detection model comprises a convolutional neural network model based on a Faster RCNN algorithm.

18. The non-transitory computer readable storage medium of claim 17, wherein the recognizing a commodity type to which the commodities to be settled in the image of the commodities to be settled belong comprises:
   establishing a fully connected layer of a convolutional neural network by a Softmax function, and calculating a confidence level of the commodities to be settled belonging to each commodity type by the convolutional neural network; and
   taking the commodity type with the confidence level greater than a preset threshold as the commodity type of the commodities to be settled;
   wherein pooling layers are provided between convolutional layers of the convolutional neural network, and a batch normalization layer is provided behind the last convolutional layer.

* * * * *